United States Patent [19]

Haas et al.

[11] Patent Number: 4,848,938
[45] Date of Patent: Jul. 18, 1989

[54] RING-SHAPED MACHINE PART

[75] Inventors: Roland Haas, Hofheim; Manfred Brandenstein, Eussenheim; Gerhard Herrmann, Schweinfurt; Karl Thurn, Obertheres, all of Fed. Rep. of Germany

[73] Assignee: SKF GmbH, Schweinfurt, Fed. Rep. of Germany

[21] Appl. No.: 107,279

[22] Filed: Oct. 9, 1987

[30] Foreign Application Priority Data

Oct. 9, 1986 [DE] Fed. Rep. of Germany ....... 3634383

[51] Int. Cl.4 .......................... F16C 43/00; F16C 27/06
[52] U.S. Cl. .................................... 384/537; 384/536; 384/543; 384/585
[58] Field of Search ............... 384/445, 449, 490, 510, 384/513, 536, 537, 543–547, 548, 582, 584, 585–589; 29/149.5 NM, 159.3, 569.5; 474/161, 190, 178; 264/182, 265, 267

[56] References Cited

U.S. PATENT DOCUMENTS

| | | | |
|---|---|---|---|
| 2,368,549 | 1/1945 | Kendall | 384/537 |
| 3,389,940 | 6/1968 | Rumsey | 384/536 |
| 3,451,736 | 6/1969 | Riccio | 384/537 |
| 4,602,875 | 7/1986 | Doerr et al. | 384/543 X |
| 4,611,933 | 9/1986 | Hoffmann et al. | 384/536 X |

Primary Examiner—Thomas R. Hannon
Attorney, Agent, or Firm—Eugene E. Renz, Jr.

[57] ABSTRACT

A ring-shaped machine part of relatively hard material with an essentially cylindrical seating surface which has at least one ring-shaped milled section on which a machine part of relatively soft material with a corresponding seating surface can be seated coaxially in a form-locking manner. The milled section is provided on at least one axial end of the hard machine part and extends, starting from the cylindrical seating surface, to the end surface.

3 Claims, 1 Drawing Sheet

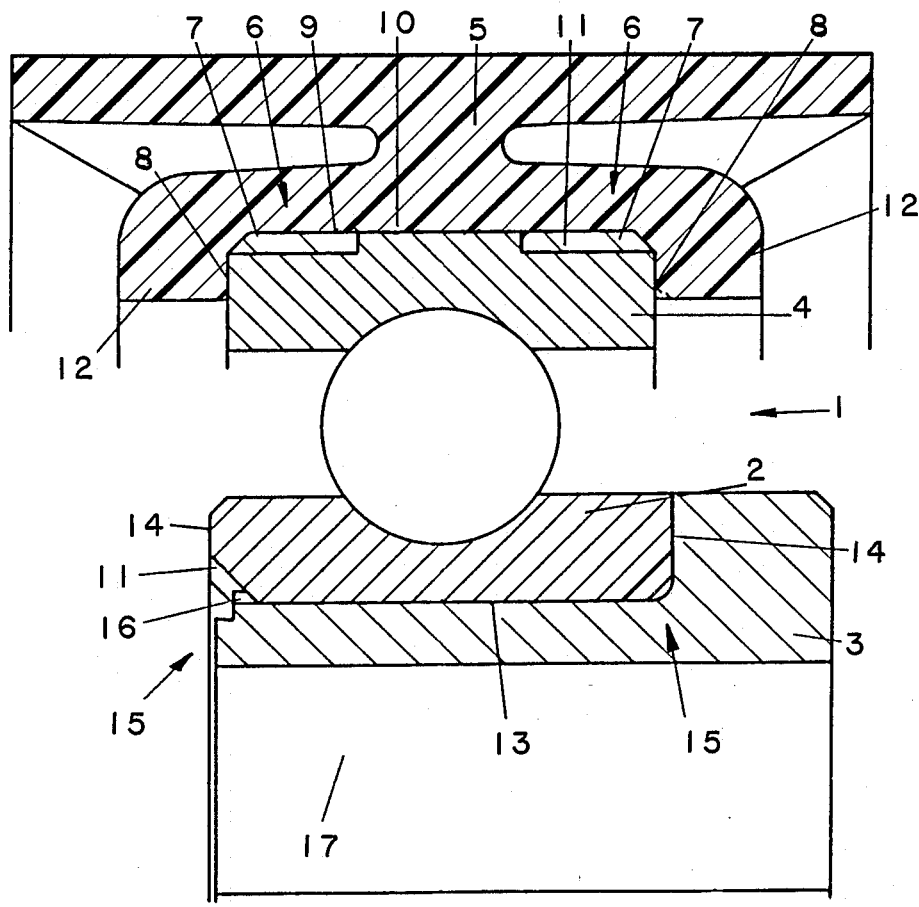

2

RING-SHAPED MACHINE PART

FIELD OF THE INVENTION

The present invention relates to a ring-shaped machine parts and a method for making the same.

BACKGROUND OF THE INVENTION

There are prior known methods for securing two coaxial machine parts which fit together via seating surfaces in a form-locking manner preventing the machine parts from rotating with respect to one another. In accordance with one prior method, the machine parts can be either pressed into or onto one another or contact with the milled area can be achieved by deforming one of the machine parts by a known deforming method such as clinching, flanging or upsetting. It is also possible to achieve a form-locking connection of this type by having the softer machine part conform to the contours of the milled area as a result of casting or injection molding. By proper selection of materials, it would also be possible to use a shrinking or expansion process to achieve the form-locking connection fit.

The milled area often does not extend over the entire seating surface, but rather only over a predetermined section thereof having adjacent grooves or rims which are not milled. Consequently, additional fixation in the axial direction is obtained. A milling can also be provided on the lateral or bore surfaces and is preferably provided on the harder of the two machine parts, so that when the parts are connected, the contours of the milling are not altered. The literature describes several types and designs for this kind of milled area. For example, in a text entitled Construction Elements Of Precision Mechanics, Carl Hanser Verlag, 1978, starting at page 160, milled areas in which other materials can be embedded are shown distributed in sections. Milling or torsion-proofing machine parts to be clinched or flanged are described in this article starting at page 176. Processes for embedding parts by means of ultrasound or by pressing are described in Erhard/Strickle, Machine Elements Of Thermoplastic Materials, Volume 1, VDJ Verlag, 1978 starting at page 88. The machine parts shown and described all have a completely milled cylindrical surface, or they have grooves or flanges provided between milled sections. These designs have certain drawbacks and problems, particularly in the case of hardened machine parts which need to be aligned very precisely and connected in a precise coaxial orientation with respect to one another. For example, the milling is usually done before hardening while the material is still soft. After hardening, these machine parts are usually ground to the final accuracy of form and dimension of the part. This is particularly applicable to roller bearing rings which after assembly to a complete bearing are connected to a second machine part such as a roller sleeve or support element. In machine parts of this type, it is impossible to finish them by means, for example, of a clamping system normally used for unmilled designs. The same is true for centerless grinding, that is, the milling creates not only recesses but, in addition, displaced areas of material flow radially beyond the previous radial level of the surface and thus increase the diameter of the machine part. The groove or flange area provided in the known designs with milled sections is also unsuitable for both standard clamping and centerless grinding since the diameter deviates from the standard dimensions. Similar problems are also encountered when the bore surfaces of hardened machine parts are milled.

SUMMARY OF THE INVENTION

With the above in mind, it is an object of the present invention to provide a ring-shaped machine part of the type discussed above where finishing can be carried out for later connection to another machine part even in the case of milled designs and wherein the milling produces a strong torsion-proof connection and facilitates particularly the precise coaxial alignment of the machine parts relative to one another. To this end, in accordance with the present invention, a milled section is provided on at least one axial end of the hardened machine part which, starting from the cylindrical seating surface, extends as far as the end surface. A smooth cylindrical region is located between the milled sections comparable to that which is used to hold completely smooth, cylindrical machine parts while they are being finish ground. When the machine elements are designed as raceways for roller bearings, the same grinding apparatus is normally used for standard unmilled raceways and can be used without repositioning or readjustment. Thus, the milled designs also correspond advantageously to the standard dimensions. Positioning of the milled sections at the edges presents an additional advantage since the relatively thin section of material in the area of the raceway is not weakened which is a particular advantage in the case of bearings with shoulders or flanges. Machine parts designed in accordance with the invention, such as a raceway of the type described, is milled appropriately during the soft machining stage. Thereafter, it is hardened and finally it is finished in the manner described. As a result, a dimensionally accurate raceway with precise dimensions according to the standard design is obtained. The finished part which is now hard can be connected to the softer machine part by injection molding, casting, pressing, flanging, clinching, shrinking and other similar means to produce a precisely aligned coaxial unit. The preciseness is required, for example, for rolling elements or for mountings in a housing. The same advantages, according to the invention, are obtained when the milling is provided on a bore surface and plastic support elements are injection-molded or cast, or bolt-like machine parts are clinched, or bushing-shaped support elements are flanged. In all cases, an axially form-locking connection is achieved since form-locking surfaces are created between the milled projections and their smooth cylindrical intermediate region.

In accordance with another feature of the present invention, the milled sections are provided at two ends and the lateral sections of the milling are disposed on the same level as the cylindrical seating surface. By this arrangement, a continuous cylindrical seating surface is obtained which is formed in the area of the milling by many crests of the milling projections. Thus, precise dimensions are achieved even in the area of the milling and these dimensions further optimize the precise alignment and the coaxial positioning of the two machine parts after connection. It is noted that sufficient depth remains between the milling projections for torsion-proofing. This design, according to the invention, is achieved since the milling projections, which after milling initially project beyond the cylindrical seating surface in the radial direction, are removed during the final processing when the intermediate smooth cylindrical area is ground by extending this processing to cover the entire width of the machine part.

In accordance with another embodiment of the invention, the milled section starts from the cylindrical seating surface and extends conically at a slant to the end surface. This configuration of the milled sections in the nature of a chamfered edge region is preferable for connections made by flanging or clinching. It is noted, however, that this connection could also be produced by means of embedding or injection. When the bore is relatively small, it is often impossible to mill the cylindrical surface of the bore because of lack of space. In this instance, the conical milled section, in accordance with this embodiment of the invention, is advantageous.

BRIEF DESCRIPTION OF THE DRAWINGS

These and other objects of the present invention and the various features and details of the operation and construction thereof are hereinafter more fully set forth with reference to the accompanying drawings, wherein:

FIG. 1 is a longitudinal sectional view through a tread roller incorporating the present invention.

DETAILED DESCRIPTION OF THE PREFERRED EMBODIMENTS

Referring now to the drawing, there is illustrated a cross section of a tread roller assembly consisting of a ball bearing 1, a support element 3 mounted in an inner ring 2 and a runner sleeve 5 made of a resilient plastic material attached to the outer ring 4. The lateral surface 10 of the outer ring 4 is provided on both sides with closed, ring-shaped milled section 6 comprising as illustrated a plurality of axially extending milling projections 7. These ring-shaped milled section 6 occupy, in each case, about 20-30% of the total width of the outer ring and extend up as far as the end surfaces 8 of the outer ring. When the bore is relatively small, it is often impossible due to space deficiency to mill the cylindrical surface of the bore. In this instance, the conical milled section arrangement of the present invention proves advantageous.

Crests 9 of the milling projection 7 are removed by the finished grinding after hardening of the outer ring together with the remaining intermediate smooth region of lateral surface 10 and are, therefore, on the same level as this region. Bearing sleeve 5 is produced by the injection molding of a plastic in a mold wherein the ball bearing 1 has been placed. In this process, the plastic flows into the recesses 11 of the milled area and a positive locking torsion-proof connection is created between the bearing sleeve 5 and the outer ring 4. An axially form-locking attachment capable of supporting extreme loads is provided by ring-shaped flange projections 12 resting against the end surfaces 8 of the outer ring 4.

Milled sections 15 are provided on the inner ring 2 commencing on both sides from the bore surface 13. These sections are slanted conically at an angle of 40-60% and extend to end surfaces 14. The effective width of these sections 15 is about 10-20% in each case of the total width of the inner ring 2. The plural milling projections 7 extend in the axial/radial direction to the slant. Support element 3 is a machine part which is relatively soft with respect to the hardened inner ring 2. Edge area 16 at the free end or in the area of the milled section 15 is peened over at several points or even over the entire circumference into recesses 11 of the milled areas. In this way, a torsion-proof axially form-locking connection is provided. Since milled section 15 on the other side has the identical design, the support element 3 can be assembled from either end. Support element 3, however, can also have a corresponding conical corner area which provides additional torsion proofing. The tread roller can be fastened to support element 3 by way of bore 17.

Even though particular embodiments of the present invention have been illustrated and described herein, it is not intended to limit the invention and changes and modifications may be made therein within the scope of the following claims.

SUMMARY OF THE INVENTION

So that two machine parts provided with seating surfaces 10 can be connected in a torsion-proof manner with precise coaxial alignment, the harder of the two has, starting from an intermediate, smooth, cylindrical area 10, milled areas 6 on both sides, which extend as far as end surfaces 8. In this way, it becomes possible to grind the parts in the hardened state in the same manner as is conventional for unmilled parts. Milling projections 7 are removed to the same level as the cylindrical seating surface 10. Alternatively, milled sections 15 can also be slanted conically and provided on the edges of machine parts 2. The designs are suitable for connecting by means of injection-molding, embedding, clinching, flanging, or the like and are suitable for a variety of bore surfaces.

What is claimed is:

1. A ring-shaped machine part of relatively hard material with an essentially cylindrical seating surface (10, 13) having at least one ring-shaped milled section (6, 15) on one axial end of the hard machine part (2, 4), on which a machine part (3, 5) of relatively soft material with a corresponding seating surface can be seated coaxially in a form-locking manner, said milled section (6) extending from the cylindrical seating surface (10) to an axial end surface (8) of the hard machine part (4), said milled section (15) starting from the cylindrical seating surface (13) and extending at a conical slant to the end surface (14) of the hard machine part (2).

2. A hardened outer ring (4) of a roller bearing (1) with an essentially cylindrical seating surface (10) having at least one ring-shaped mill section (6) on one axial end of the hardened outer ring (4), on which a machine part (5) of relatively soft material with a corresponding seating surface can be seated coaxially in a form-locking manner, said milled sections (6) extending from the cylindrical seating surface (10) to an axial end surface (8) of the hardened outer ring (4), said milled sections (6) being 20-30% as wide as the total width of the hardened outer ring (4), and said machine part (5) being a plastic part such as a roller, wheel, or sleeve, injection-molded around the hardened outer ring (4).

3. A hardened inner ring (2) for a roller bearing (1) with an essentially cylindrical seating surface (13) having at least one ring-shaped mill section (15) on one axial end of the hardened inner ring (2), on which a machine part (3) of relatively soft material with a corresponding seating can be seated coaxially in a form-locking manner, said milled sections (15) starting from the cylindrical seating surface (13) and slanting conically at an angle of 40°-60°, said milled sections (15) being 10-20% as wide as the total width of the hardened inner ring (2), and said machine part (3) being a bolt-shaped or cup-shaped support element of soft material with an edge area (16) which is flanged or clinched over toward one of the milled sections (15).

* * * * *